(12) United States Patent
Mizutani et al.

(10) Patent No.: US 11,498,643 B2
(45) Date of Patent: Nov. 15, 2022

(54) BICYCLE ELECTRIC DERAILLEUR

(71) Applicant: SHIMANO Inc., Sakai (JP)

(72) Inventors: Yuta Mizutani, Sakai (JP); Takeshi Ueda, Sakai (JP); Yuma Yamamoto, Sakai (JP)

(73) Assignee: Shimano Inc., Sakai (JP)

( * ) Notice: Subject to any disclaimer, the term of this patent is extended or adjusted under 35 U.S.C. 154(b) by 711 days.

(21) Appl. No.: 16/286,466

(22) Filed: Feb. 26, 2019

(65) Prior Publication Data

US 2020/0269954 A1 Aug. 27, 2020

(51) Int. Cl.
*B62M 9/122* (2010.01)
*B62M 25/08* (2006.01)

(52) U.S. Cl.
CPC ............ *B62M 9/122* (2013.01); *B62M 25/08* (2013.01)

(58) Field of Classification Search
CPC ..... B62M 9/122; B62M 25/08; B62M 9/1242
USPC ..................................................... 474/80, 82
See application file for complete search history.

(56) References Cited

U.S. PATENT DOCUMENTS

| | | | | |
|---|---|---|---|---|
| 5,328,414 A * | 7/1994 | Ancarani Restelli | .. | B62M 9/122 474/80 |
| 5,470,277 A * | 11/1995 | Romano | ................ | B62M 9/122 474/110 |
| 5,480,356 A * | 1/1996 | Campagnolo | .......... | B62M 9/122 280/238 |
| 6,162,140 A * | 12/2000 | Fukuda | .................. | B62M 9/122 474/70 |
| 6,623,389 B1 * | 9/2003 | Campagnolo | .......... | B62M 9/122 474/70 |
| 6,659,895 B2 * | 12/2003 | Fukuda | .................. | B62M 9/122 324/168 |
| 7,549,662 B2 * | 6/2009 | Righi | ..................... | B62M 9/122 280/257 |
| 7,892,122 B2 * | 2/2011 | Fukuda | .................. | B62M 9/122 474/82 |
| 7,942,768 B2 * | 5/2011 | Takamoto | ............. | B62M 9/122 474/82 |
| 7,980,974 B2 * | 7/2011 | Fukuda | .................. | B62M 25/08 474/70 |

(Continued)

FOREIGN PATENT DOCUMENTS

CN 108725685 A 11/2018
DE 102016107363 A1 10/2017
(Continued)

OTHER PUBLICATIONS

European Patent Office, Amended Claims Submitted in Application No. 14003552.8, Filed Oct. 17, 2014, 3 pages.

*Primary Examiner* — Henry Y Liu
(74) *Attorney, Agent, or Firm* — Alleman Hall Creasman & Tuttle LLP

(57) ABSTRACT

A bicycle electric rear derailleur 26 comprises a base member 41, a movable member 43, and a linkage structure 45. The linkage structure 45 is configured to operatively couple the base member 41 to the movable member 43. The linkage structure 45 includes at least one of a wireless communication unit receiving space S11, a charging-portion receiving space S12, a control-board receiving space S13, an operating-member receiving space S14, a display-unit receiving space S15, a connector receiving space S16 and a data-reader receiving space S17.

20 Claims, 11 Drawing Sheets

(56) References Cited

U.S. PATENT DOCUMENTS

| | | | | |
|---|---|---|---|---|
| 8,721,495 B2* | 5/2014 | Kitamura | ............... | B62M 9/122 477/7 |
| 8,900,078 B2* | 12/2014 | Yamaguchi | ............ | B62M 9/122 474/80 |
| 9,540,071 B2* | 1/2017 | Jordan | ................... | F16H 59/044 |
| 10,773,773 B2* | 9/2020 | Komatsu | ............... | B62M 25/08 |
| 10,793,222 B1* | 10/2020 | Harris | ................. | B62M 9/1244 |
| 2003/0207732 A1* | 11/2003 | Fukuda | ................. | B62M 25/08 474/80 |
| 2004/0014541 A1* | 1/2004 | Dal Pra | ............... | B62M 9/1244 474/70 |
| 2004/0102269 A1* | 5/2004 | Fukuda | ................... | B62J 45/42 474/82 |
| 2004/0116221 A1* | 6/2004 | Fukuda | ................ | B62M 9/1244 474/82 |
| 2005/0187048 A1* | 8/2005 | Fukuda | ................. | B62M 9/122 474/70 |
| 2005/0187050 A1* | 8/2005 | Fukuda | ................. | B62M 9/122 474/80 |
| 2005/0215369 A1* | 9/2005 | Fukuda | ................. | B62M 25/08 474/82 |
| 2005/0239587 A1* | 10/2005 | Ichida | .................... | B62M 9/122 474/82 |
| 2006/0183584 A1* | 8/2006 | Fukuda | ................. | B62M 25/08 474/70 |
| 2007/0191159 A1* | 8/2007 | Fukuda | ............... | B62M 9/1242 474/82 |
| 2008/0227572 A1* | 9/2008 | Sakaue | ................. | B62M 9/122 474/82 |
| 2009/0098963 A1* | 4/2009 | Watarai | ................. | B62K 23/06 474/80 |
| 2009/0209375 A1* | 8/2009 | Takamoto | ............. | B62M 25/08 474/18 |
| 2009/0215561 A1* | 8/2009 | Fukuda | ................. | B62M 9/122 474/82 |
| 2012/0149509 A1* | 6/2012 | Capogna | ............... | B62M 9/132 474/80 |
| 2012/0322591 A1* | 12/2012 | Kitamura | ................... | B62J 6/06 474/80 |
| 2013/0303317 A1* | 11/2013 | Yamaguchi | ........... | B62M 9/126 474/80 |
| 2014/0087901 A1* | 3/2014 | Shipman | ................ | B62M 9/122 474/82 |
| 2014/0155206 A1* | 6/2014 | Johnson | ................. | B62M 25/04 474/80 |
| 2014/0162817 A1* | 6/2014 | Yamaguchi | ........... | B62M 9/122 474/80 |
| 2014/0162818 A1* | 6/2014 | Yamaguchi | ........... | F16H 61/68 474/80 |
| 2014/0214285 A1* | 7/2014 | Wesling | ................. | B62J 45/414 701/51 |
| 2014/0243127 A1* | 8/2014 | Pasqua | ................... | B62M 9/122 474/80 |
| 2014/0243129 A1* | 8/2014 | Pasqua | ................ | B62M 9/1248 474/82 |
| 2014/0296009 A1* | 10/2014 | Suyama | ................. | B62M 9/122 474/80 |
| 2015/0031483 A1* | 1/2015 | Yamaguchi | ........... | B62M 9/126 474/80 |
| 2015/0111675 A1* | 4/2015 | Shipman | ................ | B62M 9/122 474/82 |
| 2016/0107723 A1* | 4/2016 | Tsai | ....................... | B62M 9/122 474/69 |
| 2016/0152301 A1* | 6/2016 | Bortoli | ................... | B62M 9/124 474/82 |
| 2016/0221640 A1* | 8/2016 | Watarai | .................. | B62M 25/08 |
| 2016/0257377 A1* | 9/2016 | Hashimoto | .............. | B62M 9/04 |
| 2016/0311491 A1* | 10/2016 | Watarai | .................. | B62M 25/08 |
| 2016/0339986 A1* | 11/2016 | Jordan | ................... | B62M 25/08 |
| 2016/0375959 A1* | 12/2016 | Calendrille, Jr. | .... | B62M 9/1242 474/122 |
| 2017/0008465 A1* | 1/2017 | Kasai | ..................... | B62M 25/08 |
| 2017/0021897 A1* | 1/2017 | Bortolozzo | ............ | B62J 45/414 |
| 2017/0096185 A1* | 4/2017 | Hara | .......................... | B62J 1/08 |
| 2017/0101155 A1* | 4/2017 | Tachibana | .............. | B62M 25/08 |
| 2017/0101162 A1* | 4/2017 | Tachibana | .............. | B62M 25/08 |
| 2017/0113759 A1* | 4/2017 | Watarai | .................... | B62J 43/30 |
| 2017/0120983 A1* | 5/2017 | Komatsu | ............... | B62K 25/286 |
| 2017/0197685 A1* | 7/2017 | Braedt | ..................... | B62J 45/42 |
| 2018/0178881 A1* | 6/2018 | Miglioranza | .......... | B62M 9/127 |
| 2018/0229803 A1* | 8/2018 | Wesling | ................. | B62M 9/132 |
| 2018/0237104 A1* | 8/2018 | Pasqua | ................ | B62M 9/122 |
| 2018/0265169 A1* | 9/2018 | Braedt | ................ | B62M 9/126 |
| 2018/0274623 A1* | 9/2018 | Brown | ................... | B62M 9/128 |
| 2018/0281899 A1* | 10/2018 | Bernardele | ............ | B62M 9/124 |
| 2018/0354586 A1* | 12/2018 | Komatsu | ............... | B62M 25/08 |
| 2019/0023351 A1* | 1/2019 | Tsai | ....................... | B62M 9/124 |
| 2019/0031287 A1* | 1/2019 | Ueda | ...................... | B62M 9/132 |
| 2019/0100279 A1* | 4/2019 | Brown | ................... | B62M 9/124 |
| 2019/0100280 A1* | 4/2019 | Brown | .................... | B62M 1/36 |
| 2019/0144071 A1* | 5/2019 | Boehm | ................ | B62M 9/1248 474/80 |
| 2019/0300111 A1* | 10/2019 | Liao | ....................... | B62M 9/122 |
| 2019/0300112 A1* | 10/2019 | Liao | ....................... | B62M 9/125 |
| 2019/0351971 A1* | 11/2019 | Dueweling | ............ | B62M 9/122 |
| 2020/0062344 A1* | 2/2020 | Liao | ..................... | B62M 9/1244 |

FOREIGN PATENT DOCUMENTS

| | | |
|---|---|---|
| DE | 102018208035 A1 | 12/2018 |
| JP | 2018150034 A | 9/2018 |

* cited by examiner

| Reduction mechanism | | Tooth number | |
|---|---|---|---|
| | | 1st reduction-ratio pattern | 2nd reduction-ratio pattern |
| First gear | Small gear portion | 9 | 9 |
| | Large gear portion | 31 | 31 |
| Second gear | Small gear portion | 10 | 9 |
| | Large gear portion | 22 | 22 |
| Third gear | Small gear portion | 10 | 9 |
| | Large gear portion | 24 | 25 |
| Fourth gear | | 43 | 44 |

FIG. 10B

BICYCLE ELECTRIC DERAILLEUR

BACKGROUND

Technical Field

The technology disclosed herein relates to a bicycle electric rear derailleur.

BACKGROUND INFORMATION

Bicycling is becoming an increasingly more popular form of recreation as well as a means of transportation. Moreover, bicycling has become a very popular competitive sport for both amateurs and professionals.

Whether the bicycle is used for recreation, transportation or competition, the bicycle industry is constantly improving the various components of the bicycle. One bicycle component that has been extensively redesigned is a bicycle electric rear derailleur. The bicycle electric rear derailleur is mounted to a bicycle frame.

SUMMARY

In accordance with a first aspect of the present invention, a bicycle electric rear derailleur comprises a base member, a movable member, and a linkage structure. The base member is configured to be mounted to a bicycle frame. The movable member is configured to be movable with respect to the base member. The linkage structure is configured to operatively couple the base member to the movable member.

The linkage structure includes at least one of a wireless communication unit receiving space, a charging-portion receiving space, a control-board receiving space, an operating-member receiving space, a display-unit receiving space, a connector receiving space and a date-reader receiving space.

With the bicycle electric rear derailleur according to the first aspect, the linkage structure includes at least one of the above spaces. In other words, at least one of a wireless communication unit, a charging-portion, a control-board, an operating-member, a display-unit and a connector is integrated into the linkage structure.

Thereby, the bicycle electric rear derailleur is capable of constructing a bicycle rear derailleur system by itself and providing the bicycle rear derailleur system by a simply configuration.

In accordance with a second aspect of the present invention, the bicycle electric rear derailleur according to the first aspect further comprises a wireless communication unit configured to be disposed to the wireless communication unit receiving space.

With the bicycle electric rear derailleur according to the second aspect, the bicycle electric rear derailleur is capable of properly disposing the wireless communication unit on the linkage structure.

In accordance with a third aspect of the present invention, the bicycle electric rear derailleur according to the second aspect is configured so that the wireless communication unit is configured to be at least partly disposed to the wireless communication unit receiving space.

With the bicycle electric rear derailleur according to the third aspect, the bicycle electric rear derailleur is capable of properly disposing the wireless communication unit on the linkage structure.

In accordance with a fourth aspect of the present invention, the bicycle electric rear derailleur according to the second or third aspect is configured so that the wireless communication unit receiving space is an interior space formed to the linkage structure.

With the bicycle electric rear derailleur according to the fourth aspect, the bicycle electric rear derailleur is capable of properly disposing the wireless communication unit in the interior space of the linkage structure.

In accordance with a fifth aspect of the present invention, the bicycle electric rear derailleur according to any one of the first to fourth aspects further comprises a charging portion configured to be disposed to the charging-portion receiving space.

With the bicycle electric rear derailleur according to the fifth aspect, the bicycle electric rear derailleur is capable of properly disposing the charging portion on the linkage structure.

In accordance with a sixth aspect of the present invention, the bicycle electric rear derailleur according to the fifth aspect is configured so that the charging portion is configured to be at least partly disposed to the charging-portion receiving space.

With the bicycle electric rear derailleur according to the sixth aspect, the bicycle electric rear derailleur is capable of properly disposing the charging portion on the linkage structure.

In accordance with a seventh aspect of the present invention, the bicycle electric rear derailleur according to the fifth or sixth aspect is configured so that the charging-portion receiving space is an interior space formed to the linkage structure.

With the bicycle electric rear derailleur according to the seventh aspect, the bicycle electric rear derailleur is capable of properly disposing the charging portion in the interior space of the linkage structure.

In accordance with an eighth aspect of the present invention, the bicycle electric rear derailleur according to any one of the first to seventh aspects further comprises a control board configured to be disposed to the control-board receiving space.

With the bicycle electric rear derailleur according to the eighth aspect, the bicycle electric rear derailleur is capable of properly disposing the control board on the linkage structure.

In accordance with a ninth aspect of the present invention, the bicycle electric rear derailleur according to the eighth aspect is configured so that the control board is configured to be at least partly disposed to the control-board receiving space.

With the bicycle electric rear derailleur according to the ninth aspect, the bicycle electric rear derailleur is capable of properly disposing the control board on the linkage structure.

In accordance with a tenth aspect of the present invention, the bicycle electric rear derailleur according to the eighth or ninth aspect is configured so that the control-board receiving space is an interior space formed to the linkage structure.

With the bicycle electric rear derailleur according to the tenth aspect, the bicycle electric rear derailleur is capable of properly disposing the control board in the interior space of the linkage structure.

In accordance with an eleventh aspect of the present invention, the bicycle electric rear derailleur according to any one of the first to tenth aspects further comprises an operating member configured to be disposed to the operating-member receiving space.

With the bicycle electric rear derailleur according to the eleventh aspect, the bicycle electric rear derailleur is capable of properly disposing the operating-member on the linkage structure.

In accordance with a twelfth aspect of the present invention, the bicycle electric rear derailleur according to the eleventh aspect is configured so that the operating member is configured to be at least partly disposed to the operating-member receiving space.

With the bicycle electric rear derailleur according to the twelfth aspect, the bicycle electric rear derailleur is capable of properly disposing the operating-member on the linkage structure.

In accordance with a thirteenth aspect of the present invention, the bicycle electric rear derailleur according to the eleventh or twelfth aspect is configured so that the operating-member receiving space is an interior space formed to the linkage structure.

With the bicycle electric rear derailleur according to the thirteenth aspect, the bicycle electric rear derailleur is capable of properly disposing the operating-member in the interior space of the linkage structure.

In accordance with a fourteenth aspect of the present invention, the bicycle electric rear derailleur according to any one of the first to thirteenth aspects further comprises a display unit configured to be disposed to the display-unit receiving space.

With the bicycle electric rear derailleur according to the fourteenth aspect, the bicycle electric rear derailleur is capable of properly disposing the display unit on the linkage structure.

In accordance with a fifteenth aspect of the present invention, the bicycle electric rear derailleur according to the fourteenth aspect is configured so that the display unit is configured to be at least partly disposed to the display-unit receiving space.

With the bicycle electric rear derailleur according to the fifteenth aspect, the bicycle electric rear derailleur is capable of properly disposing the display unit on the linkage structure.

In accordance with a sixteenth aspect of the present invention, the bicycle electric rear derailleur according to the fourteenth or fifteenth aspect is configured so that the display-unit receiving space is an interior space formed to the linkage structure.

With the bicycle electric rear derailleur according to the sixteenth aspect, the bicycle electric rear derailleur is capable of properly disposing the display unit in the interior space of the linkage structure.

In accordance with a seventeenth aspect of the present invention, the bicycle electric rear derailleur according to any one of the first to sixteenth aspects further comprises a connector configured to be disposed to the connector receiving space.

With the bicycle electric rear derailleur according to the seventeenth aspect, the bicycle electric rear derailleur is capable of properly disposing the connector on the linkage structure.

In accordance with an eighteenth aspect of the present invention, the bicycle electric rear derailleur according to the seventeenth aspect further comprises a connector configured to be at least partly disposed on the connector receiving space.

With the bicycle electric rear derailleur according to the eighteenth aspect, the bicycle electric rear derailleur is capable of properly disposing the connector on the linkage structure.

In accordance with a nineteenth aspect of the present invention, the bicycle electric rear derailleur according to the seventeenth or eighteenth aspect is configured so that the connector receiving space is an interior space formed to the linkage structure.

With the bicycle electric rear derailleur according to the nineteenth aspect, the bicycle electric rear derailleur is capable of properly disposing the connector in the interior space of the linkage structure.

In accordance with a twentieth aspect of the present invention, the bicycle electric rear derailleur according to any one of the first to nineteenth aspects further comprises a data reader configured to be disposed to the data-reader receiving space.

With the bicycle electric rear derailleur according to the twentieth aspect, the bicycle electric rear derailleur is capable of properly disposing the data reader on the linkage structure.

In accordance with a twenty-first aspect of the present invention, the bicycle electric rear derailleur according to the twentieth aspect is configured so that the data reader is configured to be at least partly disposed on the data-reader receiving space.

With the bicycle electric rear derailleur according to the twenty-first aspect, the bicycle electric rear derailleur is capable of properly disposing the data reader on the linkage structure.

In accordance with a twenty-second aspect of the present invention, the bicycle electric rear derailleur according to the twentieth or twenty-first aspect is configured so that the data-reader receiving space is an interior space formed to the linkage structure.

With the bicycle electric rear derailleur according to the twenty-second aspect, the bicycle electric rear derailleur is capable of properly disposing the data reader in the interior space of the linkage structure.

In accordance with a twenty-third aspect of the present invention, the bicycle electric rear derailleur according to any one of the first to twenty-second aspects is configured so that at least two of the wireless communication unit receiving space, the charging-portion receiving space, the control-board receiving space, the operating-member receiving space, the display-unit receiving space, the connector receiving space and the date-reader receiving space share a same space.

With the bicycle electric rear derailleur according to the twenty-third aspect, the bicycle electric rear derailleur is capable of constructing a bicycle rear derailleur system by itself and providing the bicycle rear derailleur system by a simpler configuration.

In accordance with a twenty-fourth aspect of the present invention, the bicycle electric rear derailleur according to any one of the first to twenty-third aspects further comprises a support member and at least two of a wireless communication unit, a charging portion, a control board, an operating member, a display unit, a connector and a data reader.

The support member is configured to support the at least two of a wireless communication unit, a charging portion, a control board, an operating member, a display unit, a connector and a data reader.

The at least two of the wireless communication unit, the charging portion, the control board, the operating member, the display unit, the connector and the data reader is configured to be disposed to at least two corresponding spaces of the wireless communication unit receiving space, the charging-portion receiving space, the control-board receiving space, the operating-member receiving space, the display-unit receiving space, the connector receiving space and the date-reader receiving space.

The at least two corresponding spaces share a same space. The support member is configured to be disposed to the at least two corresponding spaces.

With the bicycle electric rear derailleur according to the twenty-fourth aspect, the linkage structure includes the support member and at least two of the above elements. The at least two of the above elements are disposed to the at least two corresponding spaces which share the same space. The support member is configured to be disposed to the at least two corresponding spaces.

Thereby, the bicycle electric rear derailleur is capable of disposing at least two of the above elements on the linkage structure with the support member.

In accordance with a twenty-fifth aspect of the present invention, the bicycle electric rear derailleur according to any one of the first to twenty-fourth aspects further comprises a battery.

With the bicycle electric rear derailleur according to the twenty-fifth aspect, the bicycle electric rear derailleur is capable of constructing a bicycle rear derailleur system by itself and providing the bicycle rear derailleur system by a simple configuration.

In accordance with a twenty-sixth aspect of the present invention, the bicycle electric rear derailleur according to the twenty-fifth aspect is configured so that the linkage structure further includes a battery receiving space to which the battery is configured to be disposed.

With the bicycle electric rear derailleur according to the twenty-sixth aspect, the bicycle electric rear derailleur is capable of properly disposing the battery on the linkage structure.

BRIEF DESCRIPTION OF THE DRAWINGS

Referring now to the attached drawings, which form a part of this original disclosure:

FIG. 10B is a tooth set of gears of an electronic actuator unit of the bicycle rear sprocket assembly according to a variation of the embodiment of the present invention.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

In this embodiment, the following directional terms "forward", "rearward", "left", "right", "high", "low", "upward" and "downward" as well as any other similar directional terms refer to those directions which are determined on the basis of a rider who sits on a bicycle seat (not shown) of a bicycle with facing a bicycle handlebar (not shown).

Embodiment

<General Configuration of a Bicycle>

Figure 1:
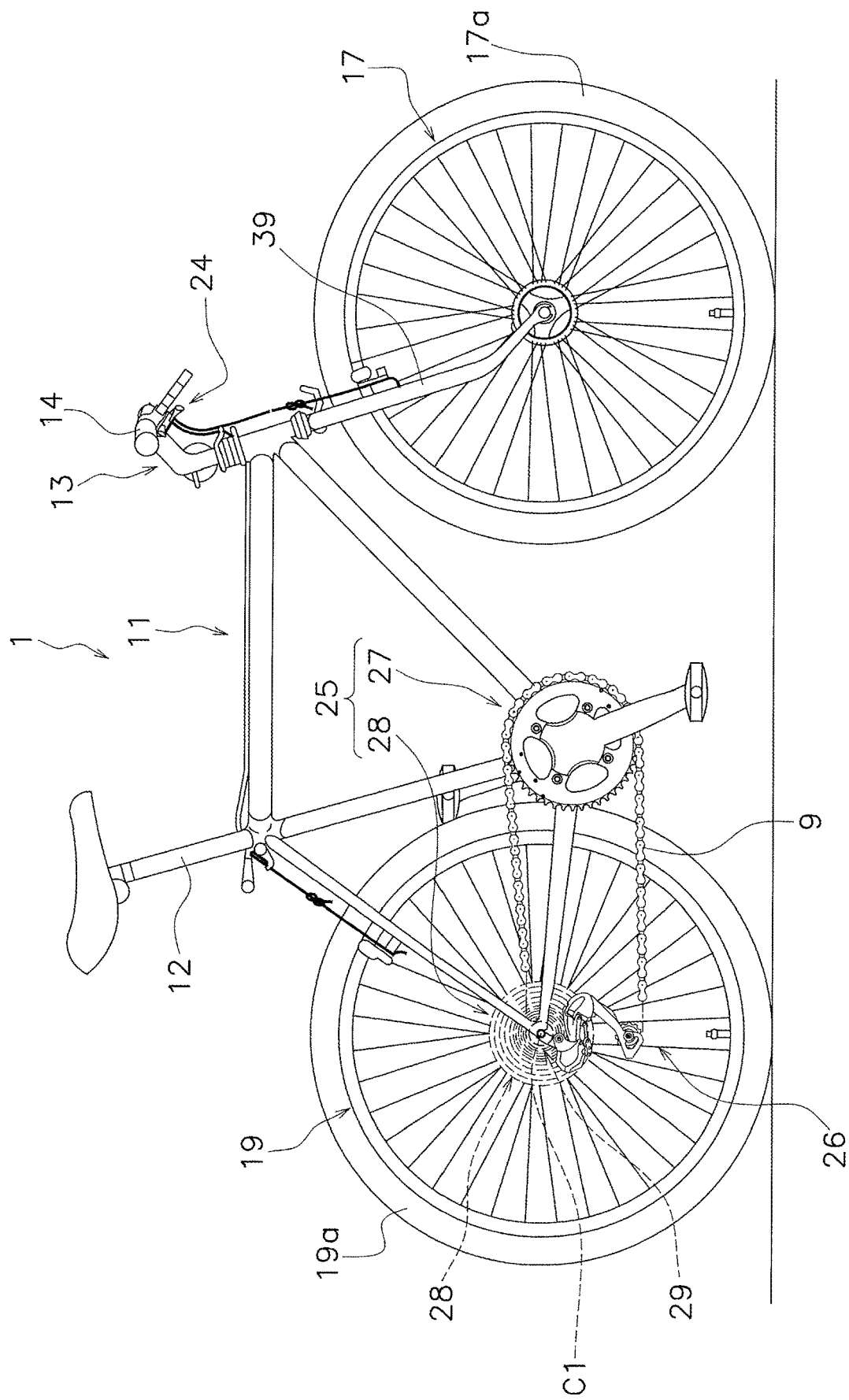
FIG. 1 is a side view of a bicycle according to an embodiment of the present invention.

As shown FIG. 1, a bicycle 1 includes a bicycle chain 9, a bicycle frame 11, a handle 13, front and rear wheels 17, 19, a shifting device 24, a driving portion 25 and a front fork 39.

The front fork 39 is rotatably attached to the bicycle frame 11. The handle 13 is fixed to the front fork 39. The front wheel 17 is rotatably attached to the front fork 39. The rear wheel 19 is rotatably attached to a rear portion of the bicycle frame 11 via a rear hub assembly 29. A front tire 17a is attached to the front wheel 17. A rear tire 19a is attached to the rear wheel 19.

The shifting device 24 is attached to the handle 13. The shifting device 24 operates a bicycle electric rear derailleur 26 via a wireless communication.

The bicycle electric rear derailleur 26 is attached to the bicycle frame 11. The bicycle electric rear derailleur 26 moves the bicycle chain 9 from one rear sprocket of a bicycle rear sprocket assembly 28 to another rear sprocket of the bicycle rear sprocket assembly 28 by operating a shifting device 24. The rear sprocket assembly 28 includes a rotational center axis C1. The rear sprockets are shown by a simplified description in FIG. 1.

The driving portion 25 mainly includes a crank assembly 27 and the bicycle rear sprocket assembly 28. Specifically, the driving portion 25 mainly includes a crank assembly 27, a rear hub assembly 29, and the bicycle rear sprocket assembly 28.

The crank assembly 27 is rotatably supported on a lower portion of the bicycle frame 11. The crank assembly 27 includes at least one front sprocket 35. In this embodiment, the crank assembly 27 includes a front sprocket 35 which engages with the bicycle chain 9.

The rear hub assembly 29 is mounted on the rear portion of the bicycle frame 11. The rear hub assembly 29 supports the bicycle rear sprocket assembly 28.

<General Configuration of the Bicycle Electric Rear Derailleur>

Figure 2:
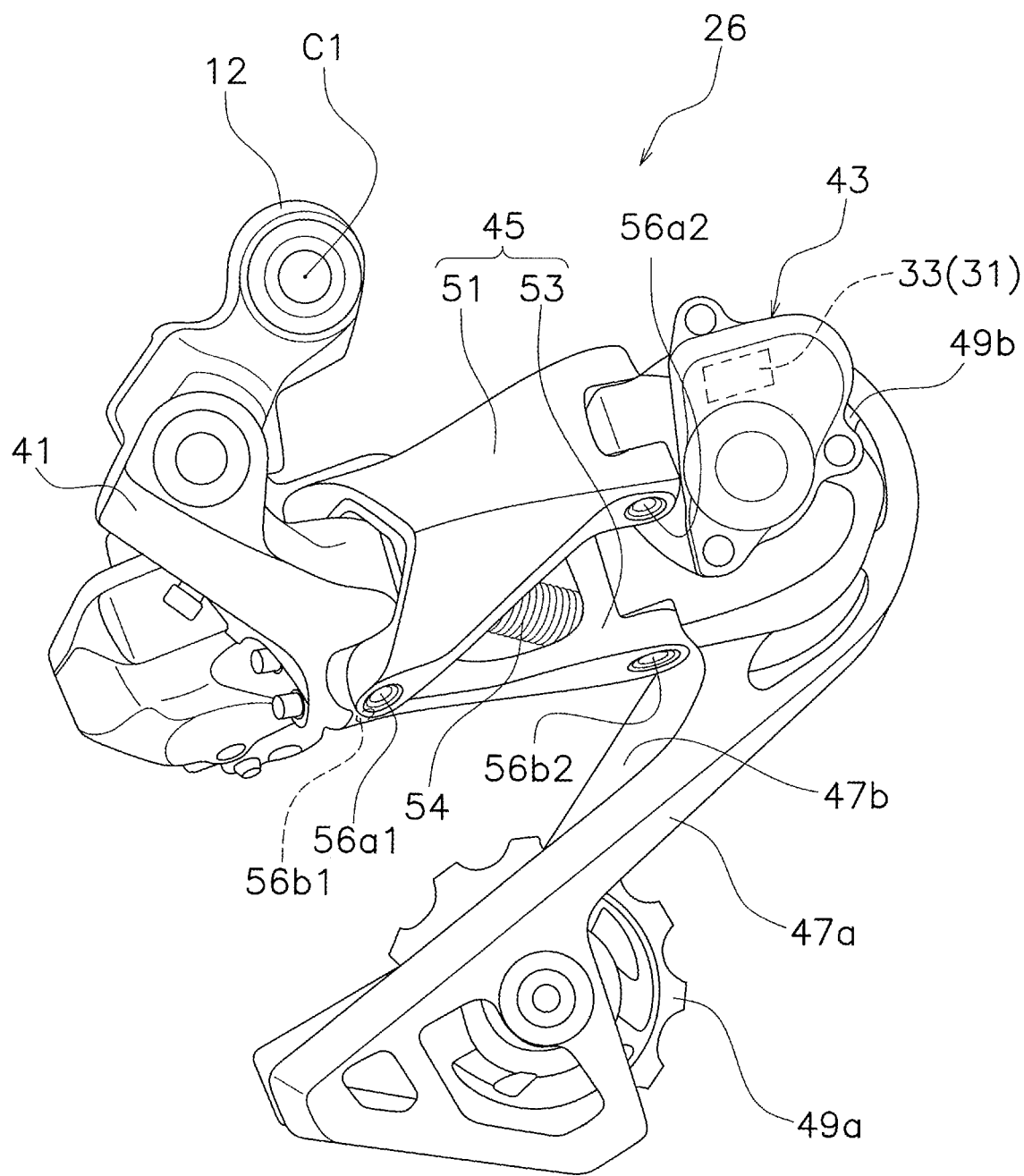
FIG. 2 is a side view from outside of the bicycle rear derailleur according to the embodiment of the present invention.

As shown in FIG. 2, the bicycle electric rear derailleur 26 comprises a base member 41, a movable member 43, and a linkage structure 45. Specifically, the bicycle electric rear derailleur 26 further comprises a pair of chain-guides 47a, 47b and a pair of pulleys 49a, 49b.

Each of the pair of chain-guides 47a, 47b is pivotably mounted on the movable member 43. The pair of pulleys 49a, 49b is disposed between the pair of chain-guides 47a, 47b. The pair of pulleys 49a, 49b is rotatably mounted on the pair of chain-guides 47a, 47b.

The bicycle electric rear derailleur 26 is operated by the shifting device 24. Specifically, the bicycle electric rear derailleur 26 is driven by an electronic actuator unit 31 via the wireless communication, when the shifting device 24 is operated.

The electronic actuator unit 31 is mounted on the movable member 43. For example, the electronic actuator unit 31 is mounted in an interior space of the movable member 43. The electronic actuator unit 31 can be mounted on the base member 41. The electronic actuator unit 31 can be mounted in an interior space of the base member 41. The electronic actuator unit 31 can be mounted in an interior space of the linkage structure 45.

The electronic actuator unit 31 is configured to operate the linkage structure 45. The electronic actuator unit 31 includes a motor 33. For example, the motor 33 is a driving source for operating the linkage structure 45.

The base member 41 is configured to be mounted to the bicycle frame 11. The base member 41 is directly or indirectly mounted to the bicycle frame 11. In this embodiment, the base member 41 is attached to the bicycle frame 11 via an attachment member 12. Specifically, the base member 41 is fixed on a rear portion of the bicycle frame 11 via an attachment member 12.

The movable member 43 is configured to be movable with respect to the base member 41. For example, the movable member 43 moves with respect to the base member 41 via the linkage structure 45. The movable member 43 pivotably supports the pair of chain-guides 47a, 47b.

The linkage structure 45 is provided separately from the movable member 43. The linkage structure 45 is configured to operatively couple the base member 41 to the movable member 43.

Specifically, the linkage structure 45 is disposed between the base member 41 and the movable member 43. The linkage structure 45 is pivotably connected to each of the base member 41 and the movable member 43. For example, the linkage structure 45 is pivotably connected to each of the base member 41 and the movable member 43 via first link shafts 56a1, 56a2 and second link shafts 56b1, 56b2. The linkage structure 45 forms a link mechanics with the base member 41 and the movable member 43.

As shown in FIG. 2, the linkage structure 45 includes a first link member 51 and a second link member 53. The first link member 51 is pivotably attached to each of the base member 41 and the movable member 43. The first link member 51 may be disposed on an upper side than the second link member 53 in a state where the bicycle center plane is parallel to a gravity direction in which the gravity acts the bicycle 1 and the bicycle electric rear derailleur 26 is mounted to the bicycle frame 11. The bicycle center plane is defined as a plane which passes through a center of the bicycle frame 11 in a width direction of the bicycle frame 11.

In this case, the first link shafts 56a1, 56a2 and the second link shafts 56b1, 56b2 is disposed so as to be parallel to the rotational center axis C1 in a state where the bicycle center plane is parallel to the gravity direction and the bicycle electric rear derailleur 26 is mounted to the bicycle frame 11.

The first link shafts 56a1, 56a2 and the second link shafts 56b1, 56b2 can be disposed so as to not be orthogonal to the rotational center axis C1 and intersect with the rotational center axis C1 in a state where the bicycle center plane is parallel to the gravity direction and the bicycle electric rear derailleur 26 is mounted to the bicycle frame 11.

The first link member 51 can be disposed on an outer side than the second link member 53 with respect to the bicycle frame 11 in a state where the bicycle center plane is parallel to the gravity direction and the bicycle electric rear derailleur 26 is mounted to the bicycle frame 11.

In this case, the first link shafts 56a1, 56a2 and the second link shafts 56b1, 56b2 is disposed so as to be orthogonal to the rotational center axis C1 in a state where the bicycle center plane is parallel to the gravity direction and the bicycle electric rear derailleur 26 is mounted to the bicycle frame 11.

The second link member 53 is pivotably attached to each of the base member 41 and the movable member 43. The second link member 53 is disposed so as to face the first link member 51. The second link member 53 is disposed at an interval from the first link member 51.

The second link member 53 is disposed on a lower side than the first link member 51 in a state where the bicycle electric rear derailleur 26 is mounted to the bicycle frame 11.

The linkage structure 45 further includes a coil spring 54. The coil spring 54 is configured to bias the movable member 43 toward the top side of the bicycle rear sprocket assembly 28, for example, toward a smallest sprocket side of the bicycle rear sprocket assembly 28. The coil spring 54 can be configured to bias the movable member 43 toward the low side of the bicycle rear sprocket assembly 28, for example, toward a largest sprocket side of the bicycle rear sprocket assembly 28

The coil spring 54 is disposed between the first link member 51 and the second link member 53. The coil spring 54 connects the first link shaft 56a1 and the second link shaft 56b2. The first link shafts 56a1, 56a2 connect the first link member 51 to the base member 41 and the movable member 43 respectively. The second link shafts 56b1, 56b2 connect the second link member 53 to the base member 41 and the movable member 43 respectively.

<Characteristic Configuration of the Bicycle Electric Rear Derailleur>

Figure 3:
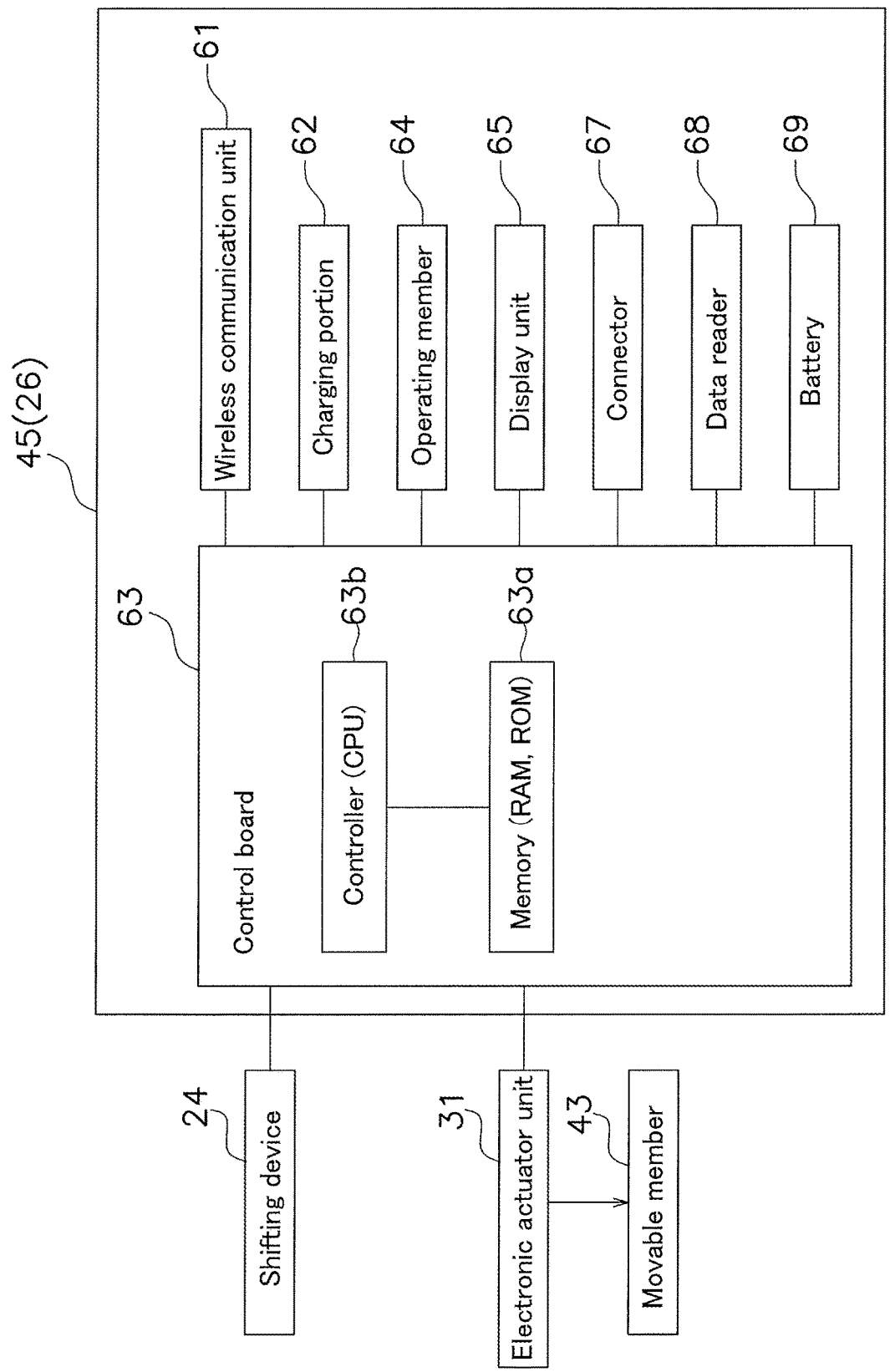
FIG. 3 is a function block diagram of the bicycle rear sprocket assembly according to the embodiment of the present invention.
Figure 4:
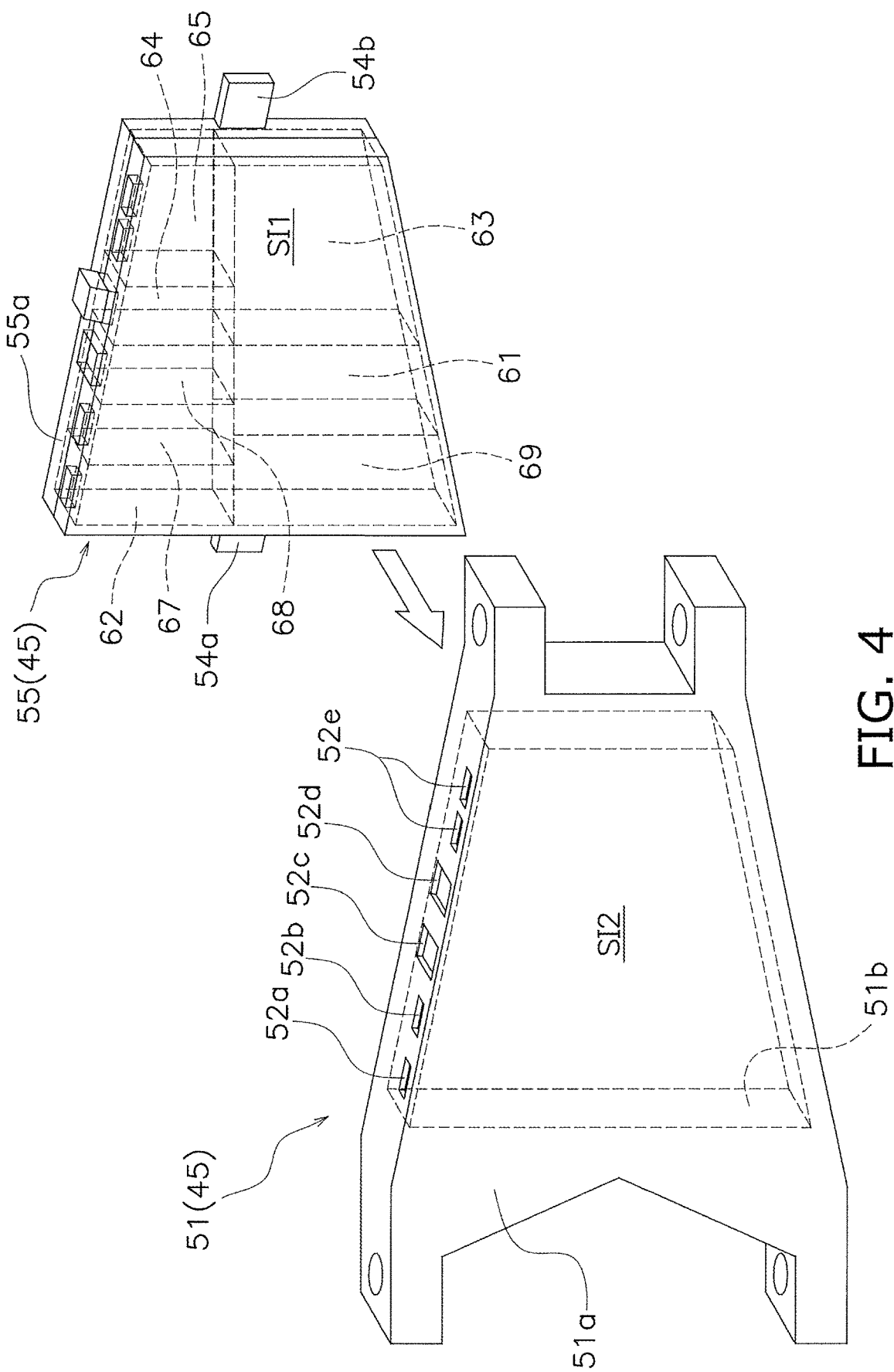
FIG. 4 is a schematically disassembled oblique view of a first link member of the bicycle rear sprocket assembly according to the embodiment of the present invention.
Figure 5:
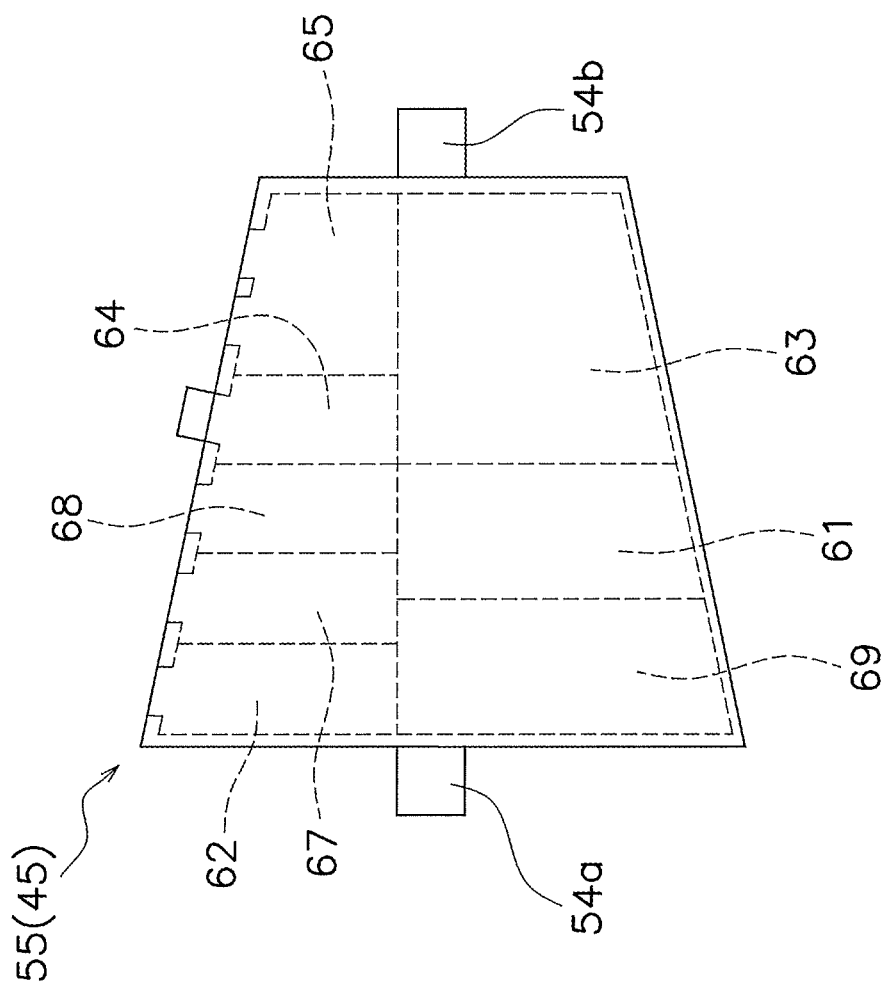
FIG. 5 is a schematic view of a support member of the bicycle rear sprocket assembly according to the embodiment of the present invention.

As shown in FIGS. 3, 4 and 5, the bicycle electric rear derailleur 26 further comprises a support member 55 and at least two of a wireless communication unit 61, a charging portion 62, a control board 63, an operating member 64, a display unit 65, a connector 67 and a data reader 68. The bicycle electric rear derailleur 26 further comprises a battery 69.

In this embodiment, the bicycle electric rear derailleur 26 further comprises the support member 55, the wireless communication unit 61, the charging portion 62, the control board 63, the operating member 64, the display unit 65, the connector 67, the data reader 68, and the battery 69.

The at least two of the wireless communication unit 61, the charging portion 62, the control board 63, the operating member 64, the display unit 65, the connector 67 and the data reader 63 is configured to be disposed to at least two corresponding spaces of the wireless communication unit receiving space S11, the charging-portion receiving space S12, the control-board receiving space S13, the operating-member receiving space S14, the display-unit receiving space S15, the connector receiving space S16 and the date-reader receiving space S17.

Specifically, the at least two of the wireless communication unit 61, the charging portion 62, the control board 63, the operating member 64, the display unit 65, the connector 67, the data reader 63 and the battery 68 is configured to be disposed to at least two corresponding spaces of the wireless communication unit receiving space S11, the charging-portion receiving space S12, the control-board receiving space S13, the operating-member receiving space S14, the display-unit receiving space S15, the connector receiving space S16, the date-reader receiving space S17 and the battery receiving space S18. The at least two corresponding spaces share a same space. The support member 55 is configured to be disposed to the at least two corresponding spaces.

The support member 55 is included in the linkage structure 45. The support member 55 is configured to support the at least two of the wireless communication unit 61, the charging portion 62, the control board 63, the operating member 64, the display unit 65, the connector 67 and the data reader 68.

In this embodiment, the support member 55 is configured to support the at least two of the wireless communication unit 61, the charging portion 62, the control board 63, the operating member 64, the display unit 65, the connector 67, the data reader 68, and the battery 69.

For example, the support member 55 supports the wireless communication unit 61, the charging portion 62, the control board 63, the operating member 64, the display unit 65, the connector 67, the data reader 68, and the battery 69. A shown in FIGS. 4 and 5, the support member 55 is mounted to the first link member 51 of the linkage structure 45.

Specifically, the support member 55 includes a housing 55a. For example, the housing 55a is formed by two piece member. The housing 55a has an interior space SI1. The wireless communication unit 61, the charging portion 62, the control board 63, the operating member 64, the display unit 65, the connector 67, the data reader 68, and the battery 69 are disposed in the interior space SI1 of the housing 55a and are attached to the housing 55a.

The housing 55a is mounted to a recess portion 51b of the first link member 51 of the linkage structure 45. The housing 55a is attached to a main body 51a of the first link member 51 of the linkage structure 45 via attachment portions 54a, 54b. The attachment portions 54a, 54b is fixed to the main body 51a of the first link member 51 by a fixing member, for example, bolts and adhesive and the like.

As shown in FIG. 3, the wireless communication unit 61 receives a shifting signal from the shifting device 24 and transmits the shifting signal to the control board 63.

The wireless communication unit 61 includes a receiving function and a transmitting function. The receiving function receives the shifting signal from the shifting device 24 via Bluetooth and wireless LAN and the like. The transmitting function may transmits the shifting signal to the control board 63.

The transmitting function can transmits a present shift position of the rear derailleur 26, a failure information and the like to anther wireless communication unit of a device which may include a control board. The device can be arranged on/in a handle arranged near the shifting device 24, a seat post, a cycle computer and the like.

The wireless communication unit 61 can connect to the control board 63 by a wired communication. For example, the wireless communication unit 61 directly connect to the control board 63 by a connecting cable via a connecting terminal.

The charging portion 62 is provided for supplying an electric power to the battery 69. The charging portion 62 includes a charging terminal such as a USB (Universal Serial Bus). Start, stop and restart of the electric power is monitored by the control board 63, for example, a controller 63b described below.

The control board 63 is provided for controlling the bicycle electric rear derailleur 26. The control board 63 includes a memory 63a and the controller 63b.

The memory 63a includes a control program for operating the bicycle electric rear derailleur 26. The memory 63a further includes an information data for performing the control program. For example, the memory 63a includes a RAM (Random Access Memory) and a ROM (Read Only Memory). The memory 63a can be provided as an external memory.

The controller 63b controls the bicycle electric rear derailleur 26 by performing the control program based on the information data of the memory 63a. For example, the controller 63b controls electronic actuator unit 31 (the motor 33) by performing the control program based on the information data of the memory 63a.

The controller 63b further controls the wireless communication unit 61, the charging portion 62, the operating member 64, the display unit 65, the connector 67, the data reader 68, and the battery 69. For example, the controller 63b includes a CPU (Central Processing Unit).

The controller 63b performs pairing processing between the wireless communication unit 61 and the other wireless communication unit of the other component except for the bicycle electric rear derailleur 26, when the operating member 64 is operated.

The controller 63b activates the wireless communication unit 61. For example, the controller 63b activates the wireless communication unit 61 based on sensor information of a sensor which detects a bicycle operation. The sensor information includes running speed information of the bicycle 1, rotation information of rear wheels 19, cadence information of the crank assembly 27, torque information inputted the crank assembly 27 and the like.

The operating member 64 is provided for adjusting the bicycle electric rear derailleur 26. For example, the operating member 64 transmits an operating signal to the control board 63, for example, the controller 63b. The controller 63b operates the electronic actuator unit 31 (the motor 33) based on the operating signal. The controller 63b adjusts a position of the linkage structure 45. Thereby, the pair of pulleys 49a, 49b is positioned to a predetermined position with respect to the bicycle rear sprocket assembly 28.

The display unit 65 is provided for displaying a traveling data of the bicycle. The traveling data is recorded on the memory 63a. The controller 63b read out the traveling data from the memory 63a and transmits the traveling data to the display unit 65.

For example, the traveling data includes a traveling log data of the bicycle and a breakdown information data of at least one of elements 61, 62, 63, 64, 65, 67, 68, 69 of the bicycle electric rear derailleur 26.

The element is a word which indicates each of the wireless communication unit 61, the charging-portion, the control-board, the operating-member, the display-unit, the connector 67, the date-reader and the battery 69.

The display unit 65 is provided for displaying a pairing condition between the wireless communication unit 61 and the other wireless communication unit of the other component. For example, the display unit 65 displays an information indicating a completion of the pairing processing, an incompletion of the pairing processing, a process of the pairing processing, and the like. The display unit 65 can display a residual of the battery 69.

The display unit 65 includes a liquid crystal display such as LED (Light Emitting Diode) display. The display unit 65 displays a traveling information (e.g. a traveling log and/or a breakdown information) with at least one of a lighting pattern, a lighting color, a character information, and an image information such as a QR code and a bar code and the like. The QR code and the bar code include the traveling information.

The connector 67 is provided for inputting an information data from an external media to the control board 63 (e.g. the memory 63a). The information data includes a setting data of the bicycle electric rear derailleur 26. The information data is recorded in the memory 63a.

The connector 67 is further provided for outputting the information data from the control board 63 (e.g. the memory 63a) to the external media. The external media includes an optical disc, a hard disc, and memory 63a card and the like.

For example, the connector 67 includes an input/output terminal such as a USB (Universal Serial Bus). The connector 67 can include an input/output terminal for directly connecting memory 63a card. Connect and disconnect of the external device to the connector 67 is monitored by the control board 63, for example, the controller 63b.

The data reader 68 is provided for reading the information data from the external device. The information data includes a setting data of the bicycle electric rear derailleur 26. The information data is recorded in the memory 63a.

For example, the setting data includes a data indicating the sprocket number of the bicycle rear sprocket assembly 28 and an interval between the adjacent sprocket of the bicycle rear sprocket assembly 28. In case that the bicycle rear sprocket assembly 28 is replaced, the controller 63b adjusts the electronic actuator unit 31 of the replaced bicycle rear sprocket assembly 28.

The data reader 68 is provided for performing a user authentication. The user authentication includes a face authentication, a fingerprint authentication, a QR code and a bar code and the like. The QR code and the bar code include a user information for the user authentication.

For example, the data reader 68 includes an image authentication device such as a camera. The data reader 68 reads a face image, a fingerprint image, the QR code and the bar code and the like. The data reader 68 transmits the read data to the control board 63, for example, the controller 63b.

The controller 63b performs a user authentication based on the read data. The user information for performing the user authentication is recorded in the memory 63a. The user information includes a user's face data, a user's fingerprint data, a user's QR code data and a user's bar code.

In case that the controller 63b determines that the read data matches the user information, the controller 63b allows an operation of the bicycle electric rear derailleur 26. In case that the controller 63b determines that the read data don't matches the user information, the controller 63b locks the bicycle electric rear derailleur 26.

The battery 69 is configured to supply the electric power to at least one of the elements 31,33, 61, 62, 63, 64, 65, 67, 68, 69 of the bicycle electric rear derailleur 26.

For example, the battery 69 supplies the electric power to the wireless communication unit 61, the charging portion 62, the control board 63, the operating member 64, the display unit 65, the connector 67 and the data reader 68.

The battery 69 is controlled by the control board 63, for example, the controller 63b. The control board 63 monitors a remaining amount of the battery 69 and controls the power supply timing to at least one of the elements 31,33, 61, 62, 63, 64, 65, 67, 68, 69 of the bicycle electric rear derailleur 26.

The control board 63 controls the electric power suppling value supplied to the motor 33 in case that the residual of the battery 69 reduces. For example, the control board 63 controls the electric power suppling value supplied to the motor 33 so that the output torque of the motor 33 reduces.

The control board 63 automatically operates the motor 33 in case that the residual of the battery 69 reduces. In this case, the control board 63 controls the motor 33 so that the chain engages with the sprocket between the smallest sprocket and the largest sprocket.

Figure 6:
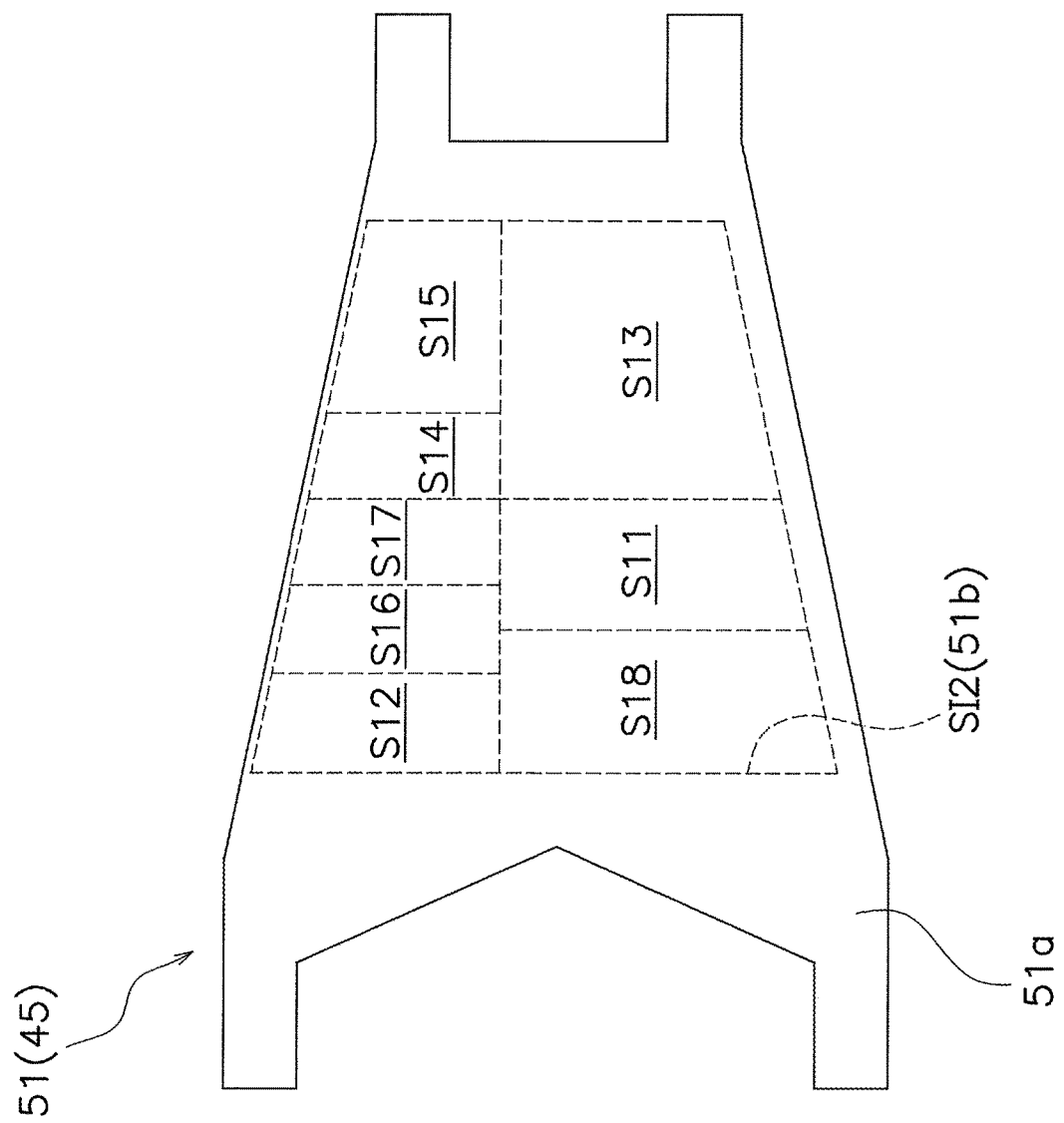
FIG. 6 is a schematic view of the first link member of the bicycle rear sprocket assembly according to the embodiment of the present invention.

As shown in FIG. 6, the linkage structure 45 includes at least one of a wireless communication unit receiving space S11, a charging-portion receiving space S12, a control-board receiving space S13, an operating-member receiving space S14, a display-unit receiving space S15, a connector receiving space S16 and a data-reader receiving space S17.

Specifically, the linkage structure 45 includes at least one of the wireless communication unit receiving space S11, the charging-portion receiving space S12, the control-board receiving space S13, the operating-member receiving space S14, the display-unit receiving space S15, the connector receiving space S16, the data-reader receiving space S17 and a battery receiving space S18. A term "receiving space" can be interpreted as a term "region".

In this embodiment, the linkage structure 45 includes the wireless communication unit receiving space S11, the charging-portion receiving space S12, the control-board receiving space S13, the operating-member receiving space S14, the display-unit receiving space S15, the connector receiving space S16, the data-reader receiving space S17 and the battery receiving space S18.

The wireless communication unit 61 and the battery 69 is preferably integrated as a unitary unit. In this case, the wireless communication unit 61 and the battery 69 are disposed to a unitary space including the wireless communication unit receiving space S11 and the battery receiving space S18.

More preferably, the wireless communication unit 61, the control board 63 and the battery 69 is integrated as a unitary unit. In this case, the wireless communication unit 61, the control board 63 and the battery 69 are disposed to a unitary space including the wireless communication unit receiving space S11, the control-board receiving space S13 and the battery receiving space S18.

As shown in FIG. 4, the first link member 51 includes the main body 51a and the recess portion 51b. The support member 55 is mounted to the main body 51a. For example, the housing 55a of support member 55 is mounted to the main body 51a via the attachment portions 54a, 54b.

The housing 55a of the support member 55 faces to the second link member 53 in a state where the housing 55a of support member 55 is mounted to the main body 51a.

The main body 51a includes a plurality of openings 52a, 52b, 52c, 52d, 52e for using the charging portion 62, the operating member 64, the display unit 65, the connector 67 and the data reader 68. The plurality of openings 52a, 52b, 52c, 52d, 52e are formed on the main body 51a in a state where the bicycle electric rear derailleur 26 is mounted to the bicycle frame 11. Each of the plurality of openings 52a, 52b, 52c, 52d, 52e passes through the main body 51a from a wall portion of the recess portion 51b.

The recess portion 51b is formed on the main body 51a. The recess portion 51b is recessed in a direction away from the second link member 53. The support member 55 is disposed in the recess portion 51b. For example, the housing 55a of the support member 55 is disposed in the recess portion 51b. Specifically, the housing 55a of the support member 55 is partly disposed in the recess portion 51b.

The housing 55a of the support member 55 can be mounted to the second link member 53 of the linkage structure 45. In this case, the recess portion 51b is provided on a main body of the second link member 53.

As shown in FIG. 6, the receiving spaces S11-S18 is provided in an interior space SI2 of the recess portion 51b of the first link member 51. The receiving spaces S11-S18 can be provided in a space between the first link member 51 and the second link member 53. The receiving spaces S11-S18 can be provided in both of the interior space SI2 of the recess portion 51b and the space between the first link member 51 and the second link member 53.

At least two of the wireless communication unit receiving space S11, the charging-portion receiving space S12, the control-board receiving space S13, the operating-member receiving space S14, the display-unit receiving space S15, the connector receiving space S16 and the data-reader receiving space S17 share a same space.

Specifically, at least two of the wireless communication unit receiving space S11, the charging-portion receiving space S12, the control-board receiving space S13, the operating-member receiving space S14, the display-unit receiving space S15, the connector receiving space S16, the data-reader receiving space S17 and the battery receiving space S18 share the same space. In this embodiment, the same space corresponds to the interior space SI2 of the recess portion 51b.

The at least two of the wireless communication unit 61, the charging portion 62, the control board 63, the operating member 64, the display unit 65, the connector 67 and the data reader 68 is configured to be disposed to at least two corresponding spaces of the wireless communication unit receiving space S11, the charging-portion receiving space S12, the control-board receiving space S13, the operating-member receiving space S14, the display-unit receiving space S15, the connector receiving space S16 and the data-reader receiving space S17.

Specifically, the at least two of the wireless communication unit 61, the charging portion 62, the control board 63, the operating member 64, the display unit 65, the connector 67, the data reader 68 and the battery 69 is configured to be disposed to at least two corresponding spaces of the wireless communication unit receiving space S11, the charging-portion receiving space S12, the control-board receiving space S13, the operating-member receiving space S14, the display-unit receiving space S15, the connector receiving space S16, the data-reader receiving space S17 and the battery receiving space S18.

The support member 55 is configured to be disposed to the at least two corresponding spaces. In this embodiment, the support member 55 is disposed to the interior space SI2, for example, the wireless communication unit receiving space S11, the charging-portion receiving space S12, the control-board receiving space S13, the operating-member receiving space S14, the display-unit receiving space S15, the connector receiving space S16, the data-reader receiving space S17 and the battery receiving space S18.

In this embodiment, the wireless communication unit 61 is configured to be disposed to the wireless communication unit receiving space S11. The wireless communication unit receiving space S11 is provided in the recess portion 51b of the first link member 51.

The wireless communication unit 61 is configured to be at least partly disposed to the wireless communication unit receiving space S11. In this embodiment, the wireless communication unit 61 is disposed to the wireless communication unit receiving space S11. The wireless communication unit receiving space S11 is included in the interior space SI2 formed to the linkage structure 45. The interior space SI2 is formed in the recess portion 51b of the linkage structure 45, for example, the recess portion 51b of the first link member 51.

The charging portion 62 is configured to be disposed to the charging-portion receiving space S12. The charging-portion receiving space S12 is provided in the recess portion 51b of the first link member 51.

The charging portion 62 is configured to be at least partly disposed to the charging-portion receiving space S12. In this embodiment, the charging portion 62 is disposed in the charging-portion receiving space S12. The charging-portion receiving space S12 is included in the interior space SI2 formed to the linkage structure 45 (e.g. the recess portion 51b).

The control board 63 is configured to be disposed to the control-board receiving space S13. The control-board receiving space S13 is provided in the recess portion 51b of the first link member 51.

The control board 63 is configured to be at least partly disposed to the control-board receiving space S13. In this embodiment, the control board 63 is disposed in the control-board receiving space S13. The control-board receiving space S13 is included in the interior space SI2 formed to the linkage structure 45 (e.g. the recess portion 51b). The control-board receiving space S13 is the interior space SI2 formed to the linkage structure.

The operating member 64 is configured to be disposed to the operating-member receiving space S14. The operating member receiving space S13 is provided in the recess portion 51b of the first link member 51.

The operating member 64 is configured to be at least partly disposed to the operating member receiving space S13. In this embodiment, the operating member 64 is disposed in the operating member receiving space S13. The operating member receiving space S13 is included in the interior space SI2 formed to the linkage structure 45 (e.g. the recess portion 51b). The operating-member receiving space S13 is the interior space SI2 formed to the linkage structure.

The display unit 65 is configured to be disposed to the display-unit receiving space S15. The display-unit receiving space S15 is provided in the recess portion 51b of the first link member The display unit 65 is configured to be at least partly disposed to the display-unit receiving space S15. In this embodiment, the display unit 65 is disposed in the display-unit receiving space S15. The display unit receiving space S15 is included in the interior space SI2 formed to the linkage structure 45 (e.g. the recess portion 51b). The display-unit receiving space S15 is the interior space SI2 formed to the linkage structure.

The connector 67 is configured to be disposed to the connector receiving space S16. The connector receiving space S16 is provided in the recess portion 51b of the first link member 51.

The connector 67 is configured to be at least partly disposed to the connector receiving space S16. In this embodiment, the connector 67 is disposed in the connector receiving space S16. The connector receiving space S16 is included in the interior space SI2 formed to the linkage structure 45 (e.g. the recess portion 51b). The connector receiving space S16 is the interior space SI2 formed to the linkage structure 45.

The data reader 68 is configured to be disposed to the data-reader receiving space S17. The data-reader receiving space S17 is provided in the recess portion 51b of the first link member 51.

The data reader 68 is configured to be at least partly disposed to the data-reader receiving space S17. In this embodiment, the data-reader receiving space S17 is included in the interior space SI2 formed to the linkage structure 45 (e.g. the recess portion 51b). The data-reader receiving space S17 is the interior space SI2 formed to the linkage structure 45. The data reader 68 is disposed in the connector receiving space S16.

The battery 69 is configured to be disposed to the battery receiving space S18. The battery receiving space S18 is provided in the recess portion 51b of the first link member 51.

The battery 69 is configured to be at least partly disposed to the battery receiving space S18. In this embodiment, the battery 69 is disposed in the battery receiving space S18. The battery receiving space S18 is included in the interior space SI2 formed to the linkage structure 45 (e.g. the recess portion 51b).

The support member 55 is configured to be at least partly disposed to the at least two corresponding spaces. In this embodiment, the support member 55 is partly disposed in the interior space SI2 formed to the linkage structure 45 (e.g. the recess portion 51b).

In this state, the wireless communication unit 61, the charging portion 62, the control board 63, the operating member 64, the display unit 65, the connector 67, the date-reader and the battery 69 is respectively disposed in the wireless communication unit receiving space S11, the charging-portion receiving space S12, the control-board receiving space S13, the operating-member receiving space S14, the display-unit receiving space S15, the connector receiving space S16, the data-reader receiving space S17 and the battery receiving space S18.

<Variation of the Embodiment>

(VA1) As a variation of the embodiment, the wireless communication unit 61 can be attached to the second link member 53 as well as the first link member 51.

(VA2) As a variation of the embodiment, the wireless communication unit 61 can be disposed in the space between the first link member 51 and the second link member 53.

Figure 7:
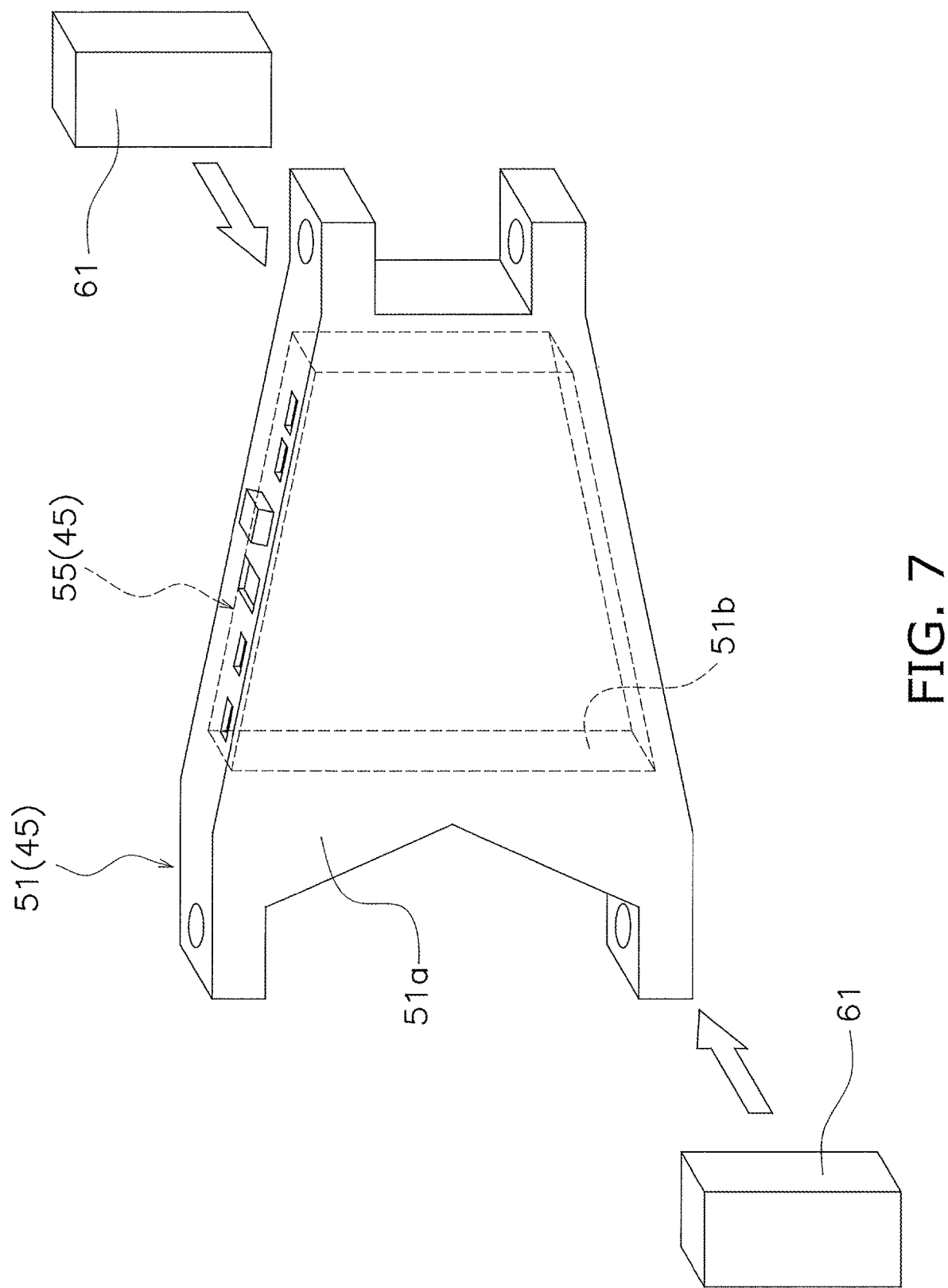
FIG. 7 is a schematically oblique view of the first link member of the bicycle rear sprocket assembly according to a variation of the embodiment of the present invention.

In this case, as shown in FIG. 7, the wireless communication unit receiving space S11 is provided in the space between the first link member 51 and the second link member 53. The wireless communication unit 61 is attached to the linkage structure 45, for example, the first link member 51.

The wireless communication unit 61 can be directly attached to the first link member 51 without the recess portion 51b. The wireless communication unit 61 can be partly attached to the recess portion 51b of the first link member 51.

(VA3) As a variation of the embodiment, the wireless communication unit 61 can be disposed on an outer surface of each of the first and second link members 51, 53 from an outer side than the first and second link members 51, 53 except for the space between the first link member 51 and the second link member 53.

In this case, as shown in FIG. 7, the wireless communication unit receiving space S11 is provided on the outer surface of the first and second link members 51, 53. The wireless communication unit 61 is attached to the linkage structure 45, for example, the outer surface from the outer side than the first link member 51 or the second link member 53.

(VA4) As a variation of the embodiment, the charging portion 62 and the connector 67 can be integrated as a unitary terminal portion. In this case, the terminal portion includes the function of both of the charging portion 62 and the connector 67. The terminal portion is disposed to the charging-portion receiving space S12 and the connector receiving space S16.

(VA5) As a variation of the embodiment, the receiving spaces S11-S18 can be defined in the interior space SI1 of the housing 55a of the support member 55.

Figure 8:
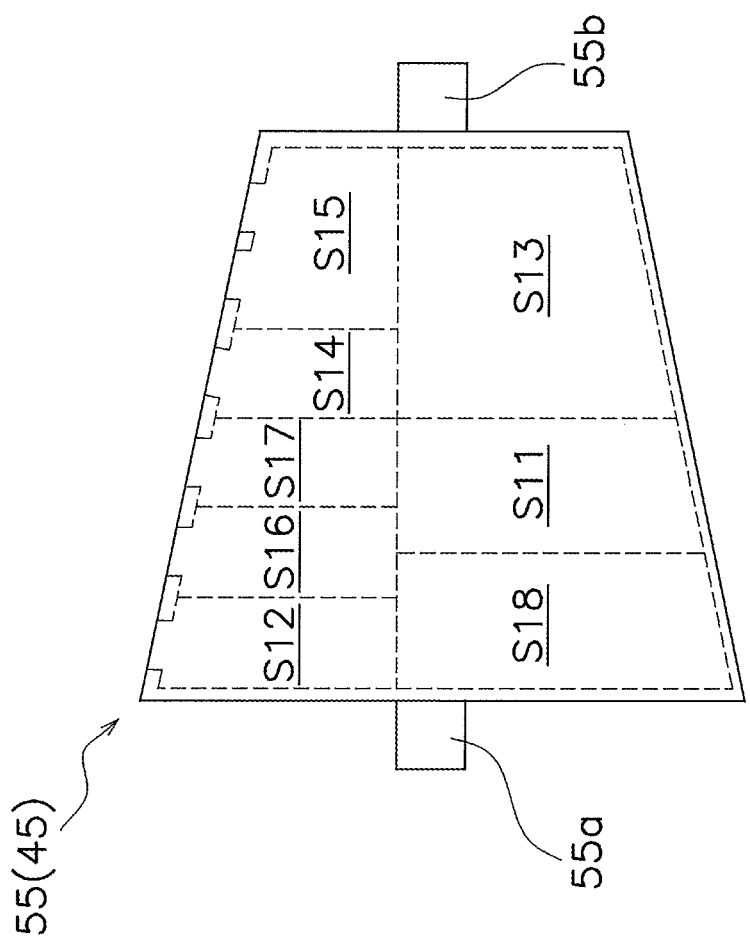
FIG. 8 is a schematically view of the support member of the bicycle rear sprocket assembly according to a variation of the embodiment of the present invention.

In this case, as shown in FIG. 8, the wireless communication unit receiving space S11, the charging-portion receiving space S12, the control-board receiving space S13, the operating-member receiving space S14, the display-unit receiving space S15, the connector receiving space S16, the data-reader receiving space S17 and the battery receiving space S18 is provided in the interior space SI1 of the housing 55a of the support member 55.

Figure 9:
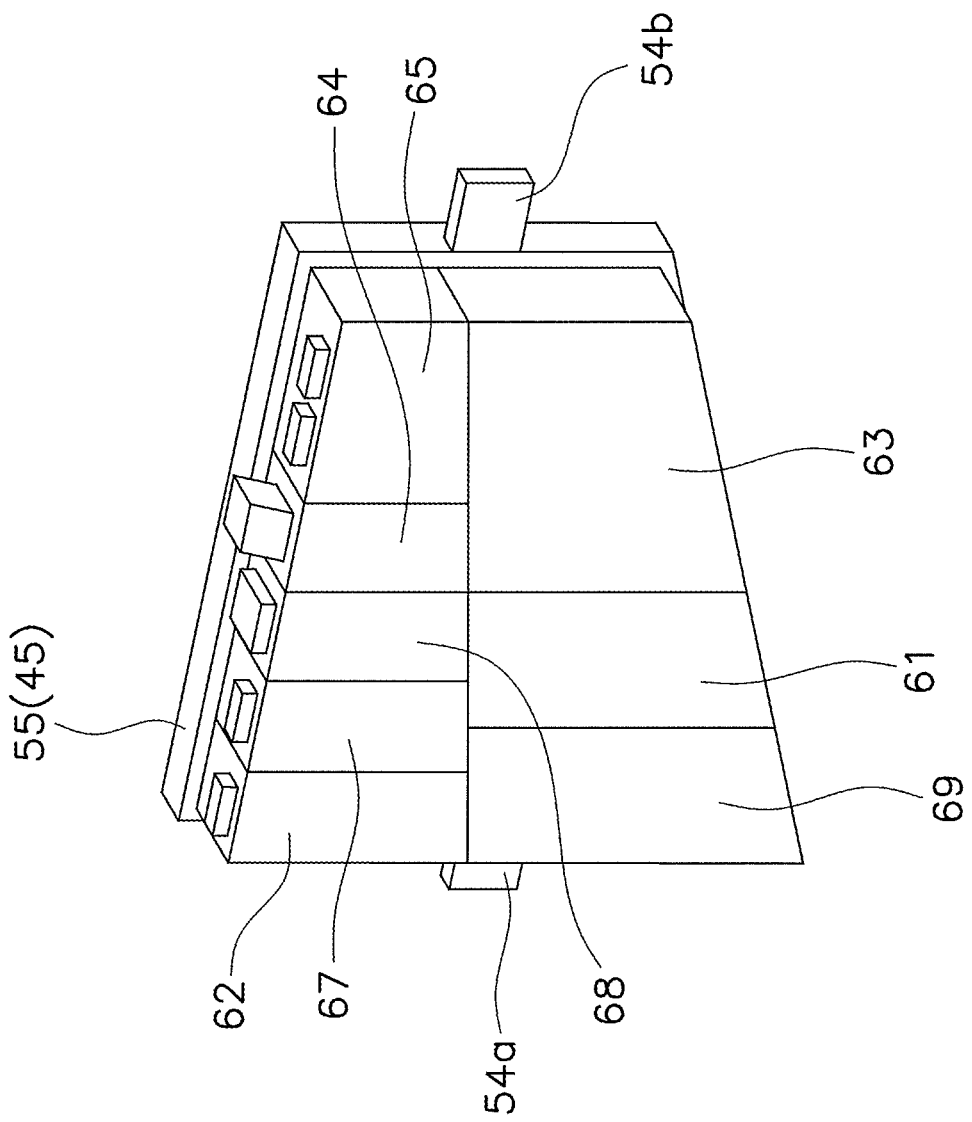
FIG. 9 is a schematically oblique view of the support member of the bicycle rear sprocket assembly according to a variation of the embodiment of the present invention.

(VA6) As a variation of the embodiment, the support member 55 can be formed in a substantially plate shape. In this case, as shown in FIG. 9, the wireless communication unit 61, the charging portion 62, the control board 63, the operating member 64, the display unit 65, the connector 67, the data reader 68, and the battery 69 is attached to the support member 55. The support member 55 is mounted to the first link member 51 (the main body 51a).

The wireless communication unit 61, the charging portion 62, the control board 63, the operating member 64, the display unit 65, the connector 67, the data reader 68, and the battery 69 is disposed to the corresponding spaces S11-S18 in the recess portion 51b of the first link member 51.

(VA7) As a variation of the embodiment, the wireless communication unit 61, the charging-portion 62, the control board 63, the operating member 64, the display unit 65, the connector 67, the date-reader and the battery 69 can be directly attached to the first link member 51 (the main body 51a).

In this case, the wireless communication unit 61, the charging portion 62, the control board 63, the operating member 64, the display unit 65, the connector 67, the data reader 68 and the battery 69 are directly disposed in the corresponding spaces S61, S62, S63, S64, S65, S67, S68, S69 in the recess portion 51b of the first link member 51 (the main body 51a). In this state, the support member 55 can be mounted to the first link member 51 (the main body 51a) for covering the elements 61, 62, 63, 64, 65, 67, 68, 69 in the recess portion 51b.

(VA8) As a variation of the embodiment, either one of the support member 55 and the first link member 51 (the main body 51a) can support the wireless communication unit 61, the charging-portion, the control board 63, the operating member 64, the display unit 65, the connector 67, the date-reader and the battery 69.

Figure 10A:
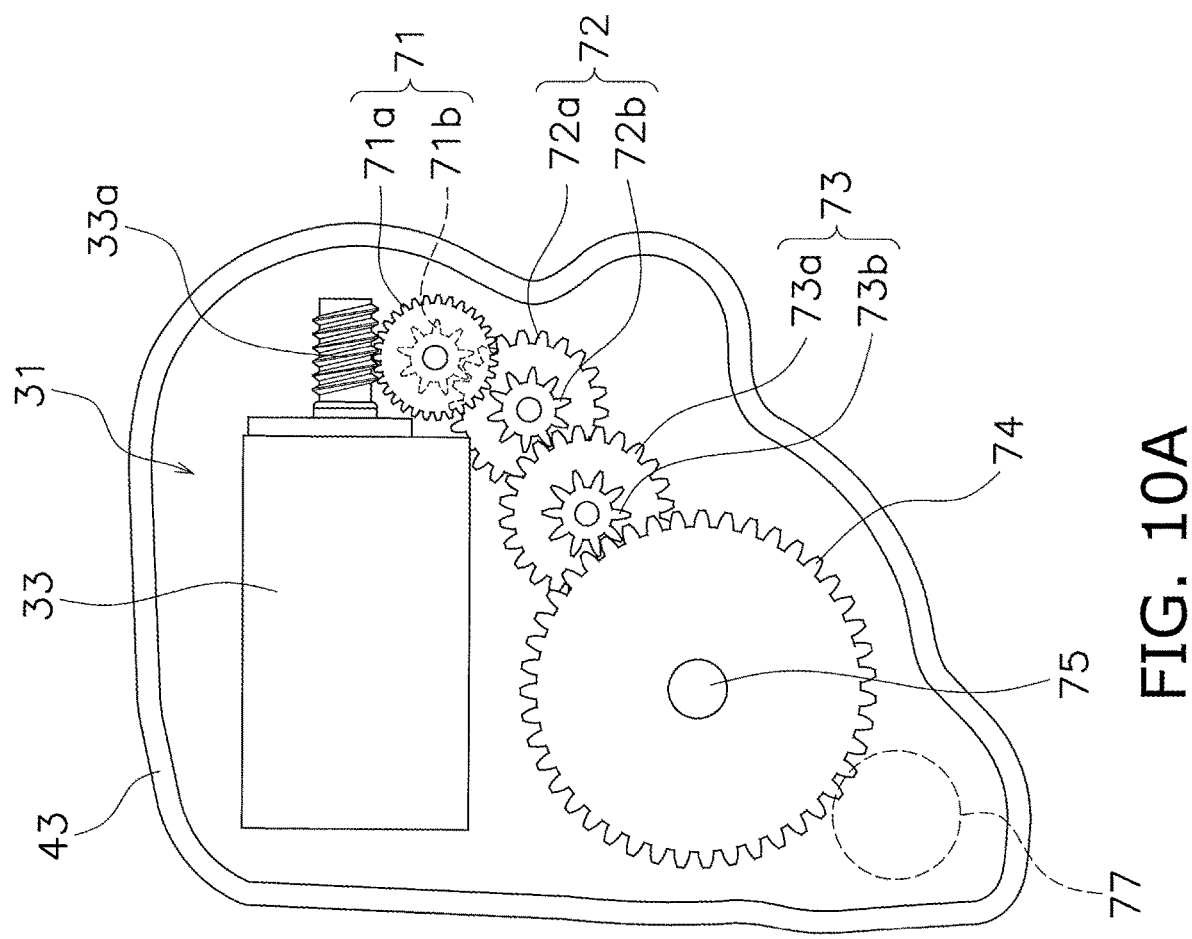
FIG. 10A is a side view (without a cover) of an electronic actuator unit of the bicycle rear sprocket assembly according to a variation of the embodiment of the present invention.

(VA9) As a variation of the embodiment, as shown in FIGS. 10A and 10B, the electronic actuator unit 31 can further includes a reduction mechanism 70. The reduction mechanism 70 includes a plurality of gears, for example, a first to fourth gears 71-74.

As shown in FIG. 10A, each of the first to third gears 71-73 is a stepped gear. The stepped gear has a large gear portion 71a-73a and a small gear portion 71b-73b. The large gear portion 71a-73a includes a lager diameter than the small gear portion 61b-63b. The fourth gear 74 is a single gear.

The large gear portion 71a of the first gear 71 engages with an output shaft 33a of the motor 33. The small gear portion 71b of the first gear 71 engages with the large gear portion 72a of the second gear 72. The small gear portion 72b of the second gear 72 engages with the large gear portion 73a of the third gear 73.

The small gear portion 73b of the third gear 73 engages with fourth gear 74. The fourth gear 74 is attached to an output shaft 75 of the reduction mechanism 70. The fourth gear 74 integrally rotates with the output shaft 75 of the reduction mechanism 70. Driving force of the output shaft 75 of the reduction mechanism 70 is transmitted to the first link shaft 56a1 via a drive gear (not shown).

As shown in FIG. 10A, an encoder gear 77 can engage with the fourth gear 74 and detect rotation of the fourth gear 74. The encoder gear 77 is disposed adjacent to the fourth gear 74. The encoder gear 77 can be disposed on a load path between the output shaft 33a of the motor 33 and the output shaft 75 of the reduction mechanism 70 or at the outer side than the load path. For example, in case that the encoder gear 77 is disposed on the load path, the encode gear 77 is arranged coaxially with at least one of the first to third gears 71-73 and rotates integrally with the at least one of the first to third gears 71-73.

As shown in FIG. 10B, each of the first to fourth gears 61-64 preferably includes a predetermined tooth number. For example, a reduction-ratio pattern is determined by combination of the tooth number of the first to fourth gears 71-74. The reduction-ratio pattern can include a first reduction-ratio pattern such as a left column of FIG. 10B. The reduction-ratio pattern can include a second reduction-ratio pattern such as a right column of FIG. 10B.

(VA11) As a variation of the embodiment, the battery can be detachably mounted to at least one of the support member 55 and the first link member 51 (the main body 51a).

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

The foregoing also applies to words having similar meanings such as the terms, "including", "having" and their derivatives. Also, the terms "part," "section," "portion," "member" or "element" when used in the singular can have the dual meaning of a single part or a plurality of parts.

Also as used herein to describe the above embodiment(s), the following directional terms "forward", "rearward", "above", "downward", "vertical", "horizontal", "below" and "transverse" as well as any other similar directional terms refer to those directions of the bicycle electric rear derailleur. Accordingly, these terms, as utilized to describe the present technology should be interpreted relative to the bicycle electric rear derailleur.

The term "configured" as used herein to describe a component, section, or part of a device implies the existence of other unclaimed or unmentioned components, sections, members or parts of the device to carry out a desired function. The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired.

Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time.

Every feature which is unique from the prior art, alone or in combination with other features, also should be considered a separate description of further technologies by the applicant, including the structural and/or functional concepts embodied by such feature(s).

Thus, the foregoing descriptions of the embodiments according to the present technologies are provided for illustration only, and not for the purpose of limiting the technology as defined by the appended claims and their equivalents.

The invention claimed is:

1. A bicycle electric rear derailleur comprising:
   a base member configured to be mounted to a bicycle frame;
   a movable member configured to be movable with respect to the base member; and
   a linkage structure configured to operatively couple the base member to the movable member, the linkage structure including a first link member and a second link member, the first link member including an interior space, wherein
   at least one of a charging-portion receiving space, an operating-member receiving space, a display-unit receiving space, and a data-reader receiving space is provided in the interior space.

2. The bicycle electric rear derailleur according to claim 1 further comprising:
   a charging portion configured to be disposed in the charging-portion receiving space.

3. The bicycle electric rear derailleur according to claim 2, wherein
   the charging portion is configured to be at least partly disposed in the charging-portion receiving space.

4. The bicycle electric rear derailleur according to claim 2, wherein
   the charging-portion receiving space is the interior space formed in the first link member.

5. The bicycle electric rear derailleur according to claim 1 further comprising:
   an operating member configured to be disposed in the operating-member receiving space.

6. The bicycle electric rear derailleur according to claim 5, wherein
   the operating member is configured to be at least partly disposed in the operating-member receiving space.

7. The bicycle electric rear derailleur according to claim 5, wherein
   the operating-member receiving space is the interior space formed in the first link member.

8. The bicycle electric rear derailleur according to claim 1 further comprising:

a display unit configured to be disposed in the display-unit receiving space.

9. The bicycle electric rear derailleur according to claim 8, wherein
the display unit is configured to be at least partly disposed in the display-unit receiving space.

10. The bicycle electric rear derailleur according to claim 8, wherein
the display-unit receiving space is the interior space formed in the first link member.

11. The bicycle electric rear derailleur according to claim 1 further comprising:
a data reader configured to be disposed in the data-reader receiving space.

12. The bicycle electric rear derailleur according to claim 11 wherein
the data reader is configured to be at least partly disposed to the data-reader receiving space.

13. The bicycle electric rear derailleur according to claim 11, wherein
the data-reader receiving space is the interior space formed in the first link member.

14. The bicycle electric rear derailleur according to claim 1, wherein
at least two of the charging-portion receiving space, the operating-member receiving space, the display-unit receiving space, and the data-reader receiving space share a same space.

15. The bicycle electric rear derailleur according to claim 1 further comprising:
a support member and at least two of a charging portion, an operating member, a display unit, and a data reader, wherein
the support member is configured to support the at least two of the charging portion, the operating member, the display unit, and the data reader, wherein
the at least two of the charging portion, the operating member, the display unit, and the data reader are configured to be disposed in at least two corresponding spaces of the charging-portion receiving space, the operating-member receiving space, the display-unit receiving space, and the data-reader receiving space, wherein
the at least two corresponding spaces share a same space, and
the support member is configured to be disposed in the at least two corresponding spaces.

16. The bicycle electric rear derailleur according to claim 1 further comprising a battery.

17. The bicycle electric rear derailleur according to claim 16 wherein,
the linkage structure further includes a battery receiving space in which the battery is configured to be disposed.

18. The bicycle electric rear derailleur according to claim 1, wherein
the charging-portion receiving space and at least one of the operating-member receiving space, the display-unit receiving space, and the data-reader receiving space are provided in the interior space.

19. The bicycle electric rear derailleur according to claim 1, wherein
the bicycle electric rear derailleur is mounted to the bicycle frame,
the first link member is disposed on an upper side of the linkage structure relative to the second link member in a state where a bicycle center plane is parallel to a gravity direction, and
the bicycle center plane is defined as a plane passing through a center of the bicycle frame in a width direction of the bicycle frame.

20. A bicycle electric rear derailleur comprising:
a base member configured to be mounted to a bicycle frame;
a movable member configured to be movable with respect to the base member;
a linkage structure configured to operatively couple the base member to the movable member, the linkage structure including a first link member and a second link member, the first link member including a first outer surface facing the second link member, the first link member including a second outer surface opposite to the first outer surface; and
a recess portion formed in the first outer surface, the recess portion extending from the first outer surface toward the second outer surface without penetrating the second outer surface, wherein
at least one of a wireless communication unit receiving space, a charging-portion receiving space, a control-board receiving space, an operating-member receiving space, a display-unit receiving space, a connector receiving space, and a data-reader receiving space is provided in the recess portion.

* * * * *

UNITED STATES PATENT AND TRADEMARK OFFICE
CERTIFICATE OF CORRECTION

PATENT NO. : 11,498,643 B2
APPLICATION NO. : 16/286466
DATED : November 15, 2022
INVENTOR(S) : Yuta Mizutani et al.

Page 1 of 1

It is certified that error appears in the above-identified patent and that said Letters Patent is hereby corrected as shown below:

In the Claims

Column 19, Claim 15, Line 36, delete "wherein",

Column 19, Claim 15, Line 43, delete "wherein".

Signed and Sealed this
Seventeenth Day of January, 2023

Katherine Kelly Vidal
*Director of the United States Patent and Trademark Office*